US011951757B2

(12) United States Patent
Gamm

(10) Patent No.: US 11,951,757 B2
(45) Date of Patent: Apr. 9, 2024

(54) PIXEL BOARD PRINT SYSTEM WITH INTERCHANGEABLE ELEMENTS AND METHOD OF USE

(71) Applicant: Prixel Press, LLC, Philmont, NY (US)

(72) Inventor: Brandon Gamm, Hudson, NY (US)

(73) Assignee: Prixel Press, LLC., Philmont, NY (US)

( * ) Notice: Subject to any disclaimer, the term of this patent is extended or adjusted under 35 U.S.C. 154(b) by 0 days.

(21) Appl. No.: 18/111,768

(22) Filed: Feb. 20, 2023

(65) Prior Publication Data

US 2023/0264503 A1 Aug. 24, 2023

Related U.S. Application Data

(60) Provisional application No. 63/311,675, filed on Feb. 18, 2022.

(51) Int. Cl.
*B41K 1/08* (2006.01)
*B41K 1/36* (2006.01)

(52) U.S. Cl.
CPC . *B41K 1/08* (2013.01); *B41K 1/36* (2013.01)

(58) Field of Classification Search
CPC . B41K 1/08; B41K 1/36; B41K 1/003; B41K 1/04; B41K 1/54
See application file for complete search history.

(56) References Cited

U.S. PATENT DOCUMENTS 2,222,333 A 11/1940 Wenzel et al.
2,921,516 A * 1/1960 Munson .................. B41K 1/08 101/381
2,962,964 A * 12/1960 Munson .................. B41K 1/08 101/380
3,012,501 A * 12/1961 Munson .................. B41K 1/08 101/381
3,403,623 A 10/1968 Blackwood
8,146,494 B2 * 4/2012 Hutchison ............ B26D 7/2614 101/390
8,522,680 B2 9/2013 Angevine
10,071,547 B2 9/2018 Paul
(Continued)

FOREIGN PATENT DOCUMENTS

DE 2000300 7/1976
DE 4200267 A1 * 7/1993 ........... A63F 3/0625
DE 9406998 10/1995
(Continued)

OTHER PUBLICATIONS

"International Search Report & Written Opinion; PCT/US2023/013416".

*Primary Examiner* — Christopher E Mahoney
*Assistant Examiner* — Marissa Ferguson-Samreth
(74) *Attorney, Agent, or Firm* — Law Office of Mark Brown, LLC; Christopher M DeBacker

(57) ABSTRACT

A print board with a grid for receiving one or more rubber or silicone stamps of various shapes, sizes, and patterns. A base board is provided to receive the print board, and the base board allows the print board to be turned upside down and pressed to a piece of paper or other surface once all inserted stamps have been secured. Each stamp has an upper portion which includes a shape, a letter, or some other pattern which can be stamped to a surface. Each stamp also has a lower portion which wedges into a selected opening within the grid of the print board.

8 Claims, 15 Drawing Sheets

(56) References Cited

U.S. PATENT DOCUMENTS

| | | | |
|---|---|---|---|
| 2007/0157835 | A1 | 7/2007 | Kucaba |
| 2016/0221322 | A1 | 8/2016 | Paul |

FOREIGN PATENT DOCUMENTS

| | | | | |
|---|---|---|---|---|
| FR | 2723549 | | | 2/1996 |
| GB | 1589859 | | | 2/1978 |
| GB | 2428633 | | | 2/2007 |
| JP | 3129629 | U | * | 3/2007 |
| KR | 102380009 | | | 4/2023 |
| WO | 20180100046 | | | 4/2018 |

* cited by examiner

PIXEL BOARD PRINT SYSTEM WITH INTERCHANGEABLE ELEMENTS AND METHOD OF USE

CROSS-REFERENCE TO RELATED APPLICATION

This application claims priority in U.S. Provisional Patent Application No. 63/311,675 Filed Feb. 18, 2022, which is incorporated herein by reference.

BACKGROUND OF THE INVENTION

1. Field of the Invention

The present invention relates generally to a printing system and method for use thereof, and more specifically to a manual pixel board print system with interchangeable elements and customization features.

2. Description of the Related Art

Manual printing presses and printing stamps are well known. However, the existing devices either require expensive and technical machinery or otherwise are too simple to produce highly customizable prints. Furthermore, letterpress type is typically "locked up" by pressing type together, where removing one sort ruins the integrity of the entire setup. Other do-it yourself rubber stamp systems often require tweezers to be able to remove a single piece of type from a line. What is needed is a simple, easy to clean and reuse printing system for providing highly customizable prints.

Heretofore there has not been available a system or method for a printing system with the advantages and features of the present invention.

BRIEF SUMMARY OF THE INVENTION

The present invention generally provides a print board with a grid for receiving one or more rubber or silicone stamps of various shapes, sizes, and patterns. A base board is provided to receive the print board, and the base board allows the print board to be turned upside down and pressed to a piece of paper or other surface once all inserted stamps have been secured.

Each stamp has an upper portion which includes a shape, a letter, or some other pattern which can be stamped to a surface. Each stamp also has a lower portion which wedges into a selected opening within the grid of the print board. When the print is complete, the base board can be removed and the individual stamps can be removed from the print board simply by pressing against the base of the lower portion of the stamp.

A single stamp can cover one or more of the individual openings within the grid. The stamps can be rotated 90 degrees, 180 degrees, or 270 degrees to create new patterns or shapes.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
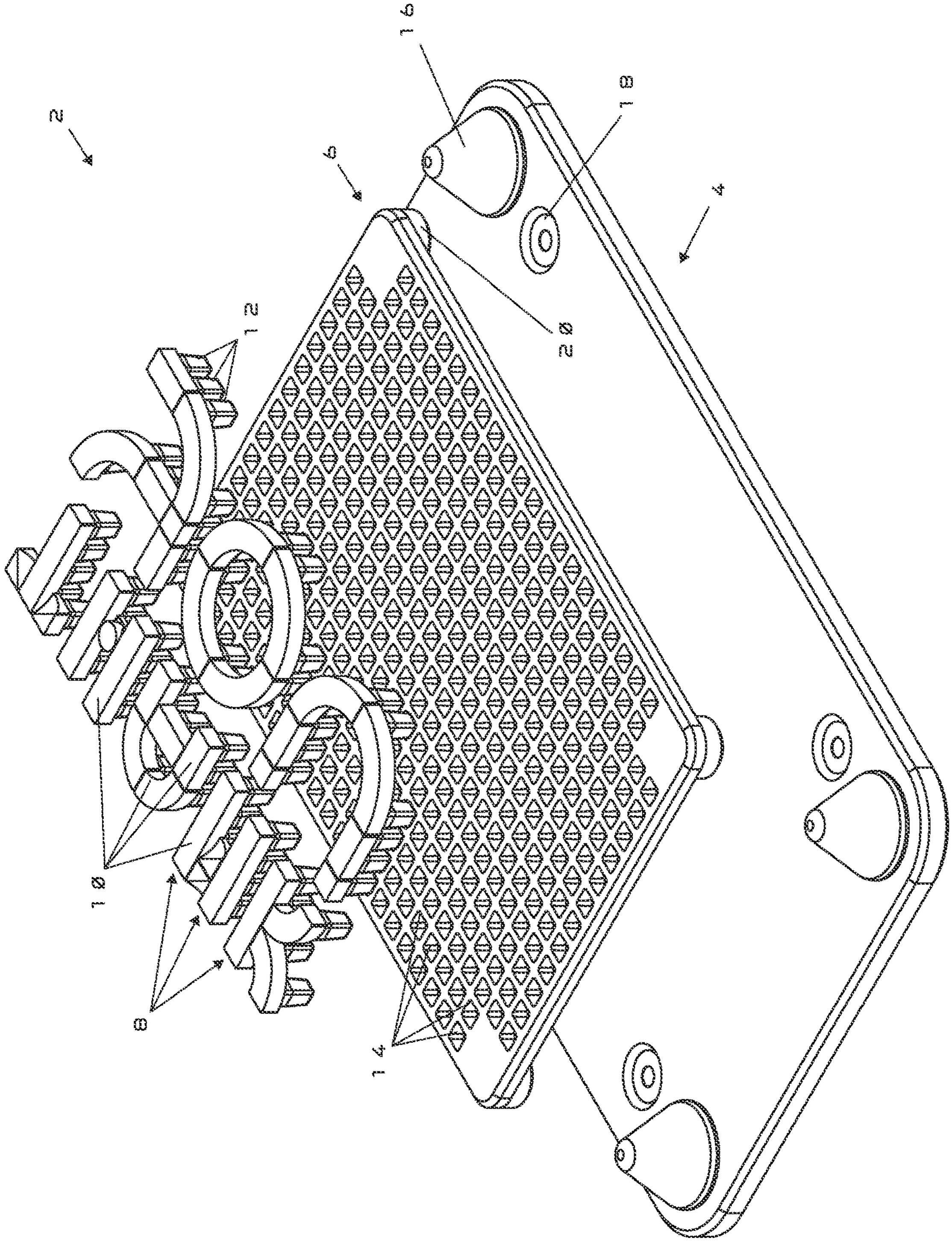
FIG. 1 is a three-dimensional, exploded isometric view of an embodiment of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Print System 2

As shown in the figures, the present invention is a manual print system 2 which includes a print board 6, a base board 4 for receiving the print board 6, and several different stamps 8 of various shapes, sizes, and patterns. These stamps 8 may be color-coordinated to make it simpler to discern which shaped stamp is selected to be inserted into the grid of the print board. The print board 6 has several openings 14 forming the grid. As shown, the grid openings are square, but other shapes could be used.

Figure 2:
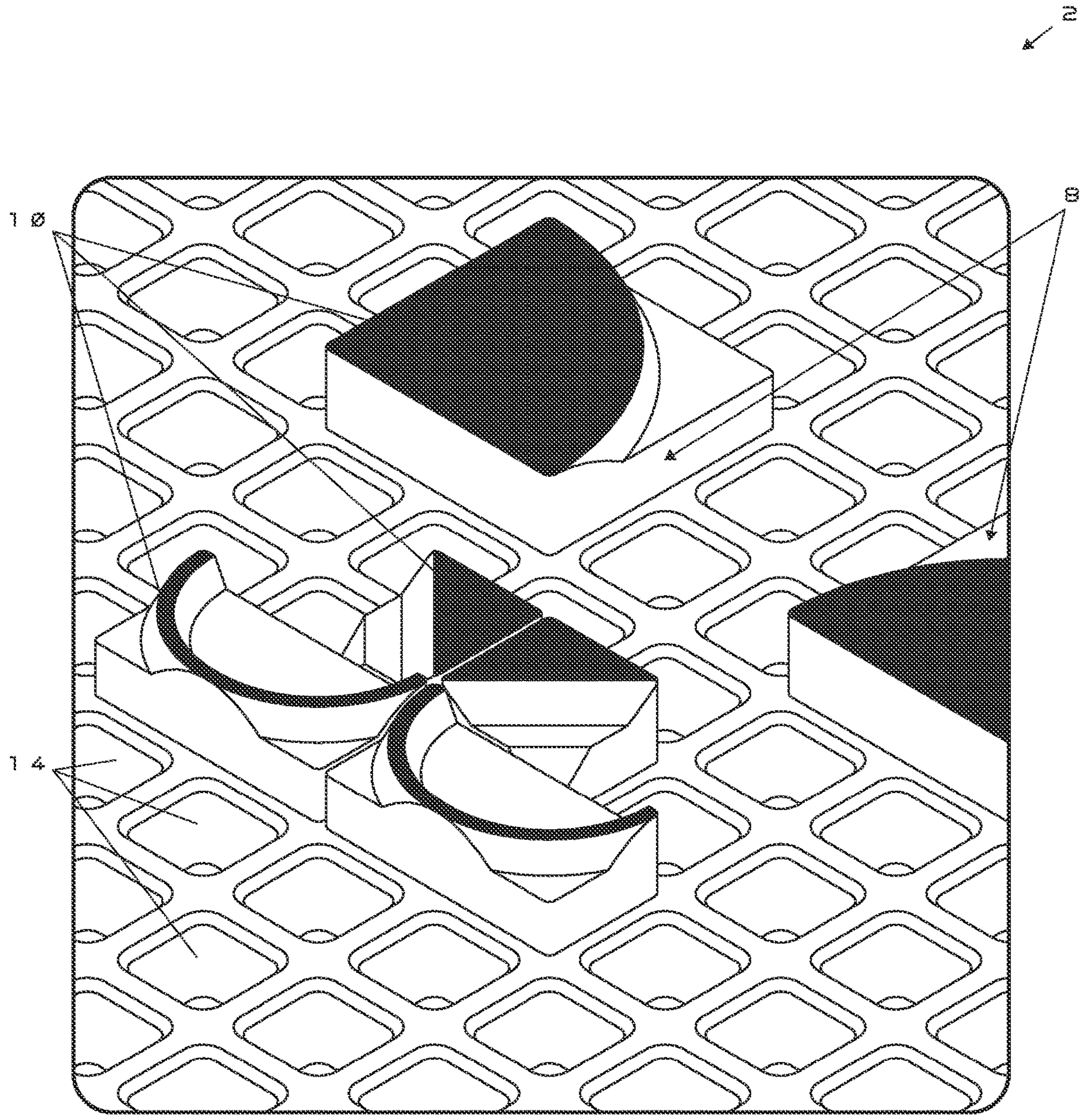
FIG. 2 is a detailed three-dimensional isometric view of an embodiment of the present invention shown in an assembled state.
Figure 4:
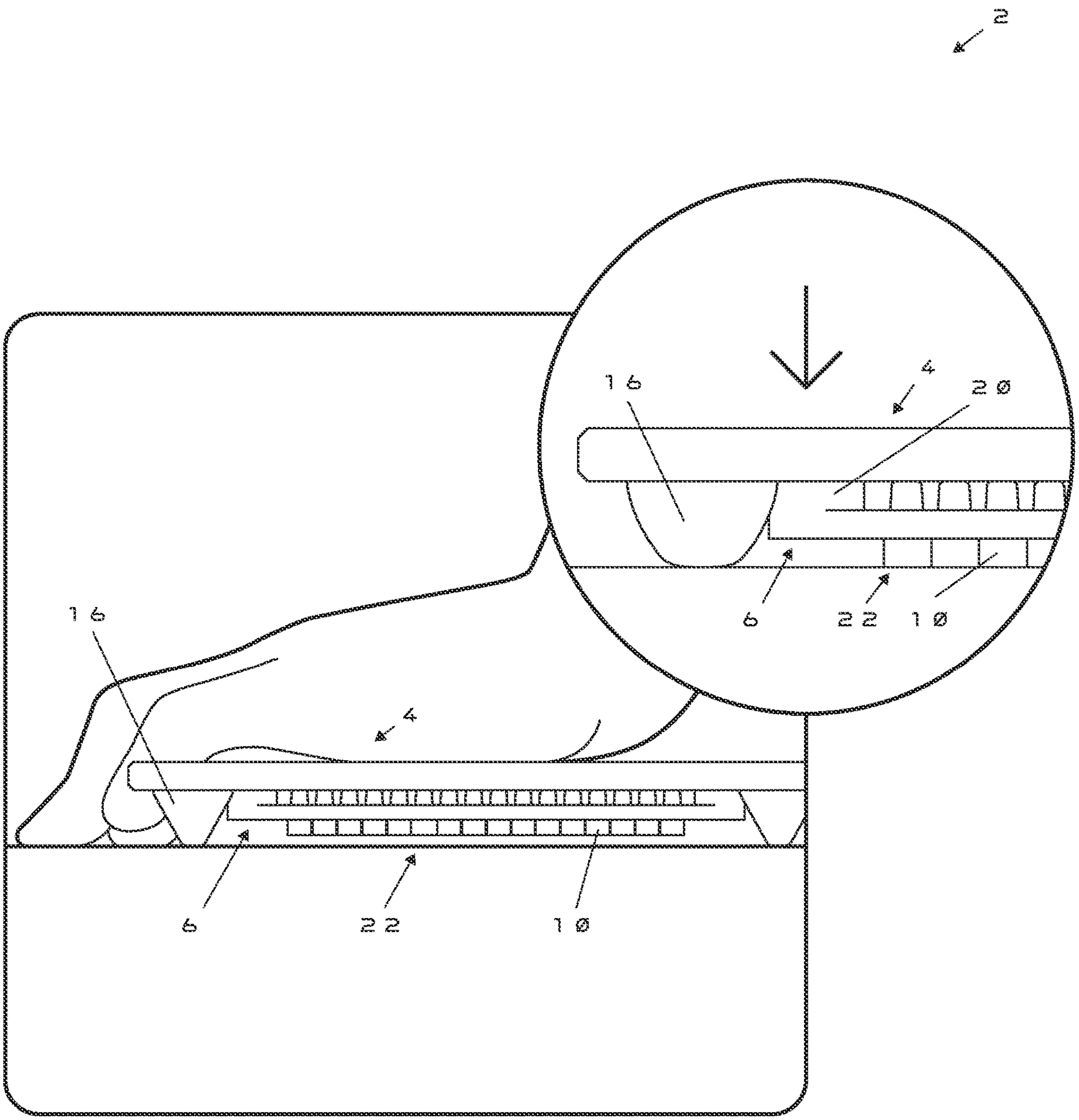
FIG. 4 is a side elevational view showing the use of an embodiment of the present invention in a typical environment of a sheet of paper or other printable surface.

FIG. 1 shows multiple stamps 8 being inserted into the print board 6 to form a complete image. Each stamp 8 has a top portion 10 with a pattern or shape (and a bottom portion 12 which tapers and can be received within an opening of the grid 14. FIG. 1 goes further to show how the print board 6 locks into the base board 4, securing the stamps 8. The base board 4 and print board 6 are then flipped, allowing the user to press down onto a surface to print an image from ink placed atop the stamps as shown in FIG. 4. The four conical stoppers 16 on each corner of the base board 4 prevent the image from being distorted through slipping or over-pressing the stamps into the surface. This further allows the user to precisely move the press into place and prevents accidental printing until the user is ready and pressure is applied. FIG. 2 shows a top view once certain stamps 8 have been installed within the grid 14.

Figure 3:
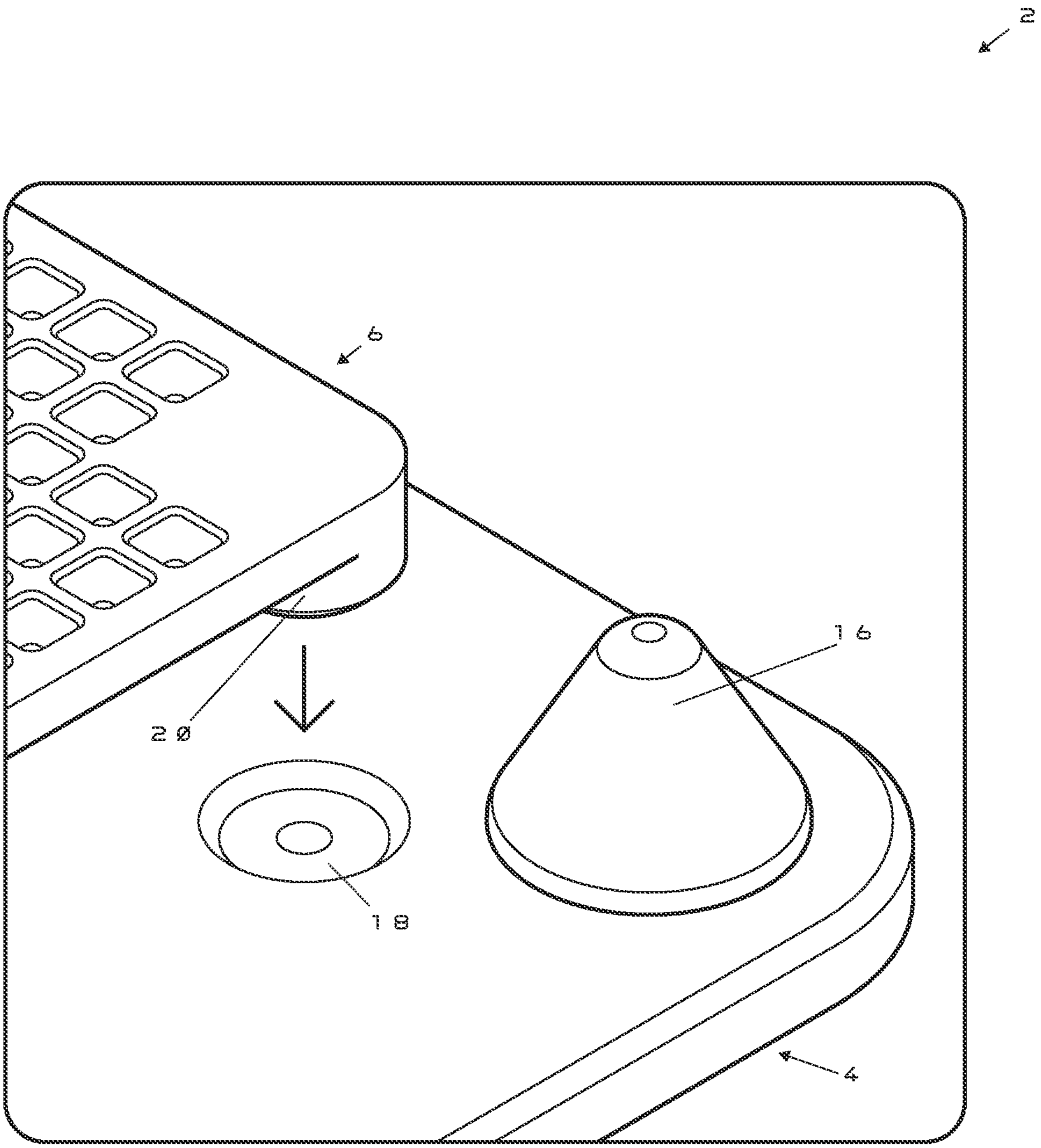
FIG. 3 is another detailed three-dimensional isometric view showing the installation of a print board element onto a base board element.

FIG. 3 shows in more detail how the foot 20 of the print board 6 interlocks with a receiver 18 of the base board 4. The receiver 18 and foot 20 may magnetically attach to one another for a more secure connection.

Figure 5:
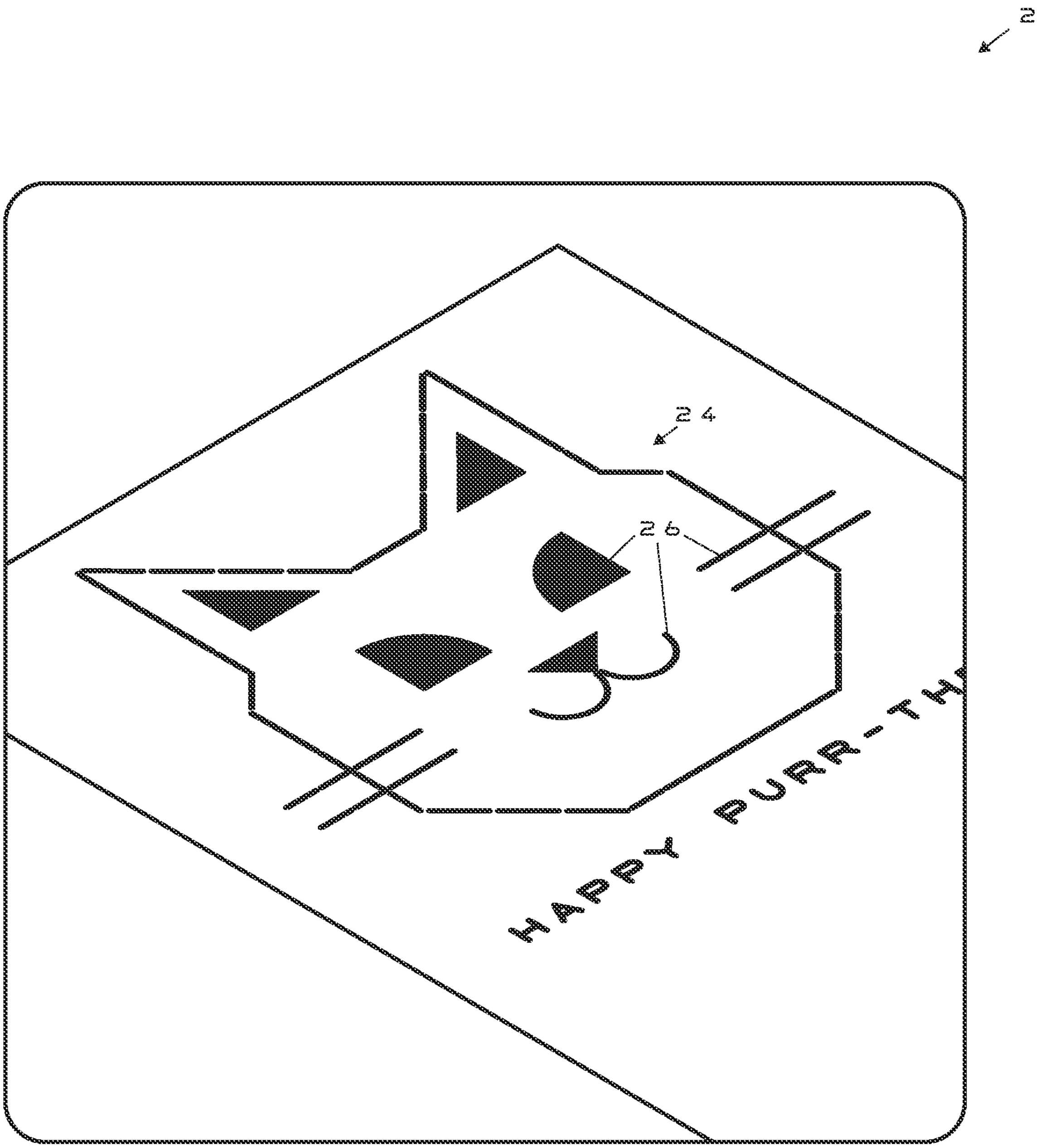
FIG. 5 is a three-dimensional isometric view of the environment thereof after use of the present invention.

FIG. 4 shows how the base board 4 and print board 6 are inverted, with the top portions 10 of the stamps 8 being pressed against a printing surface 22 such as a sheet of paper. FIG. 5 finally shows a resulting print of these steps. The printed image 24 is shown, created from various inked elements 26 created by the stamps 8.

Figure 6:
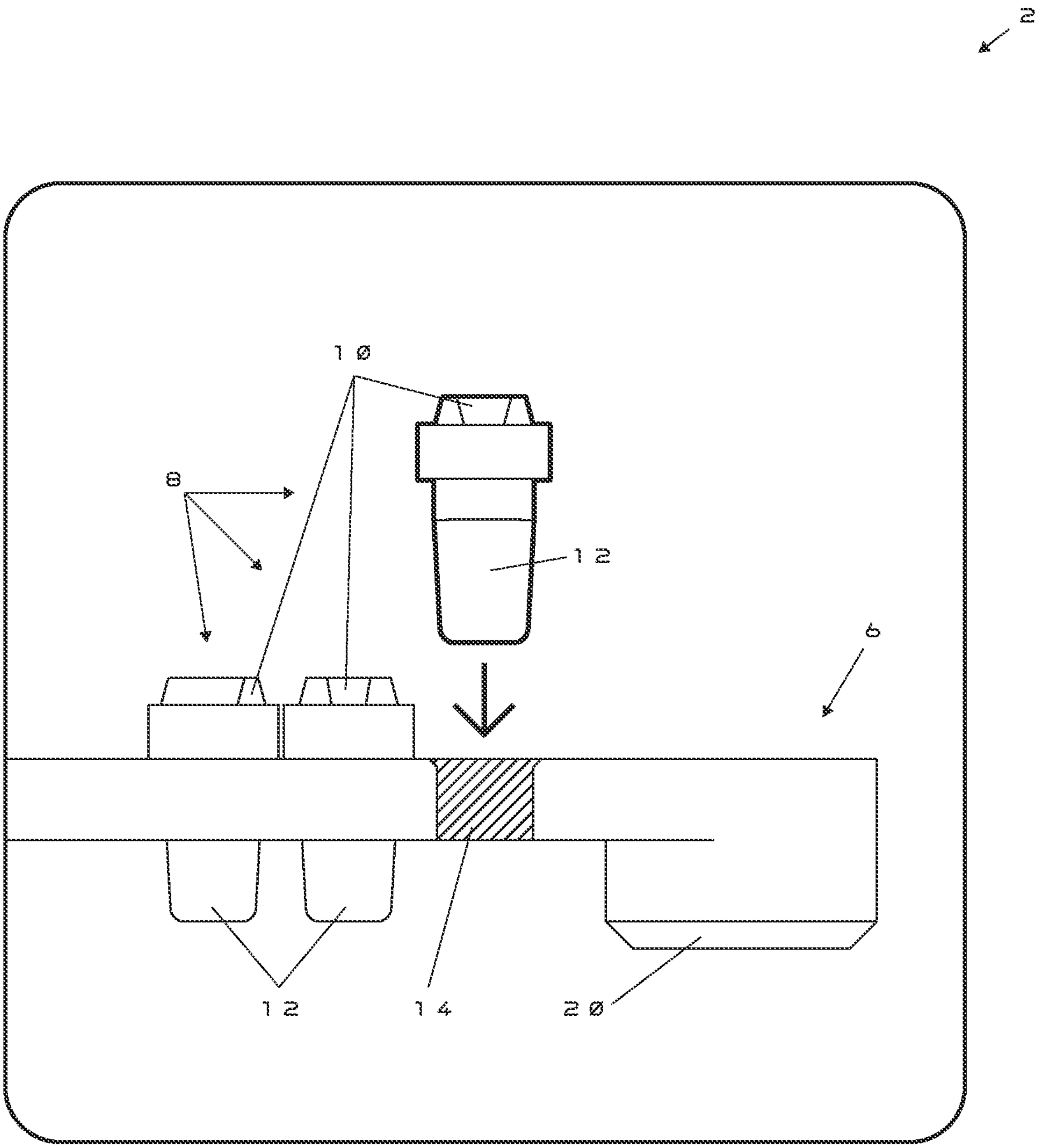
FIG. 6 is a side elevational view of the present invention showing the installation of a stamp element into the print board element.
Figure 7A:
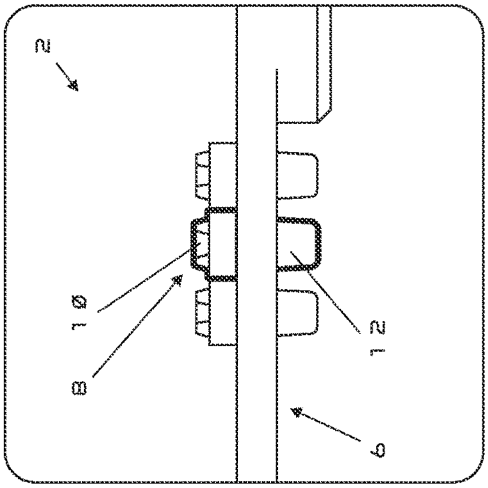
FIG. 7A is a side elevational view showing a first step showing the removal of the stamp element from the print board element.
Figure 7B:
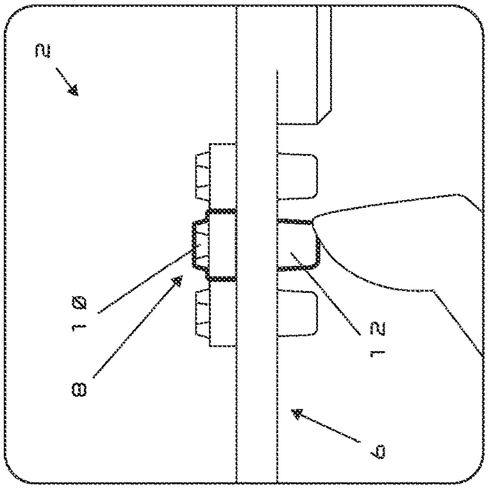
FIG. 7B is a side elevational view showing a second step showing the removal of the stamp element from the print board element.
Figure 7C:
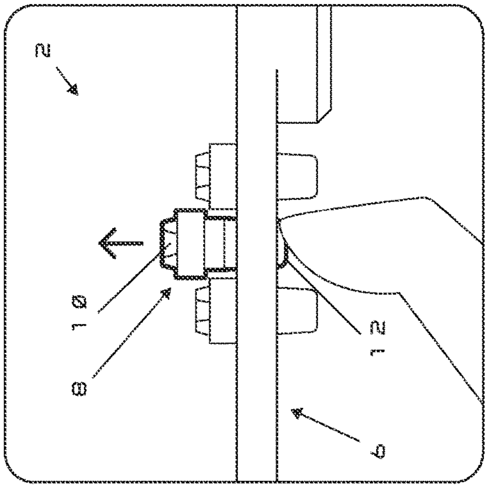
FIG. 7C is a side elevational view showing a third step showing the removal of the stamp element from the print board element.
Figure 7D:
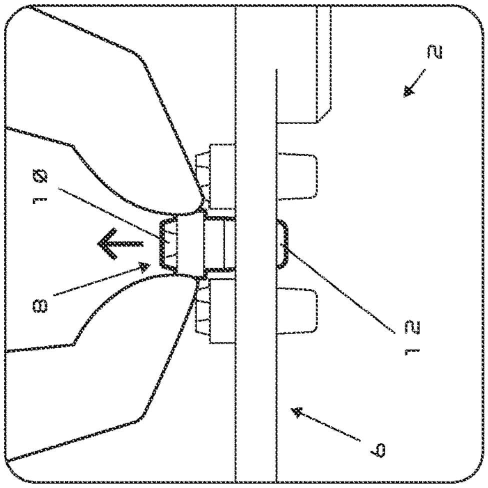
FIG. 7D is a side elevational view showing a fourth step showing the removal of the stamp element from the print board element.
Figure 7E:
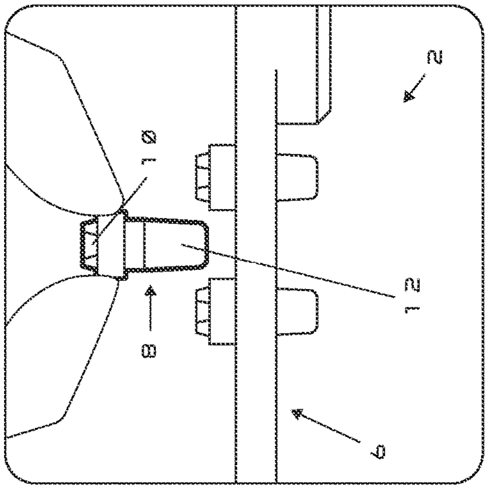
FIG. 7E is a side elevational view showing a fifth step showing the removal of the stamp element from the print board element.
Figure 7F:
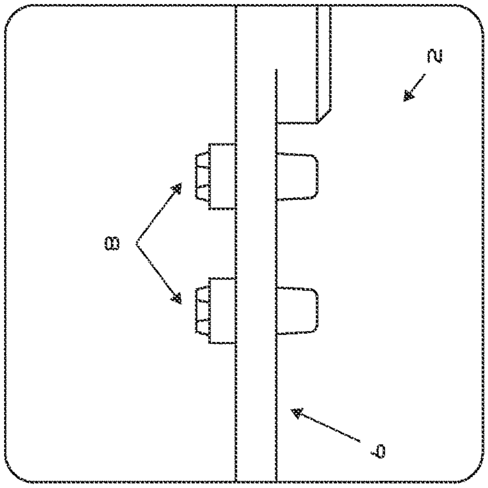
FIG. 7F is a side elevational view showing a sixth step showing the removal of the stamp element from the print board element.

FIG. 6 shows how the stamps 8 are inserted into the print board 6 with the bottom portion 12 being inserted into a grid element 14. FIGS. 7A-7F show how the stamps 8 are similarly removed by simply pressing upward against the bottom portion and then gripping and removing the stamp 8 from the top portion 10 which may include a lip preventing the stamp from slipping through the grid 14. Each of the stamps 8 can be removed independently without disturbing nearby stamps. This can be done using a finger, removing the need for tools such as tweezers.

Figure 8:
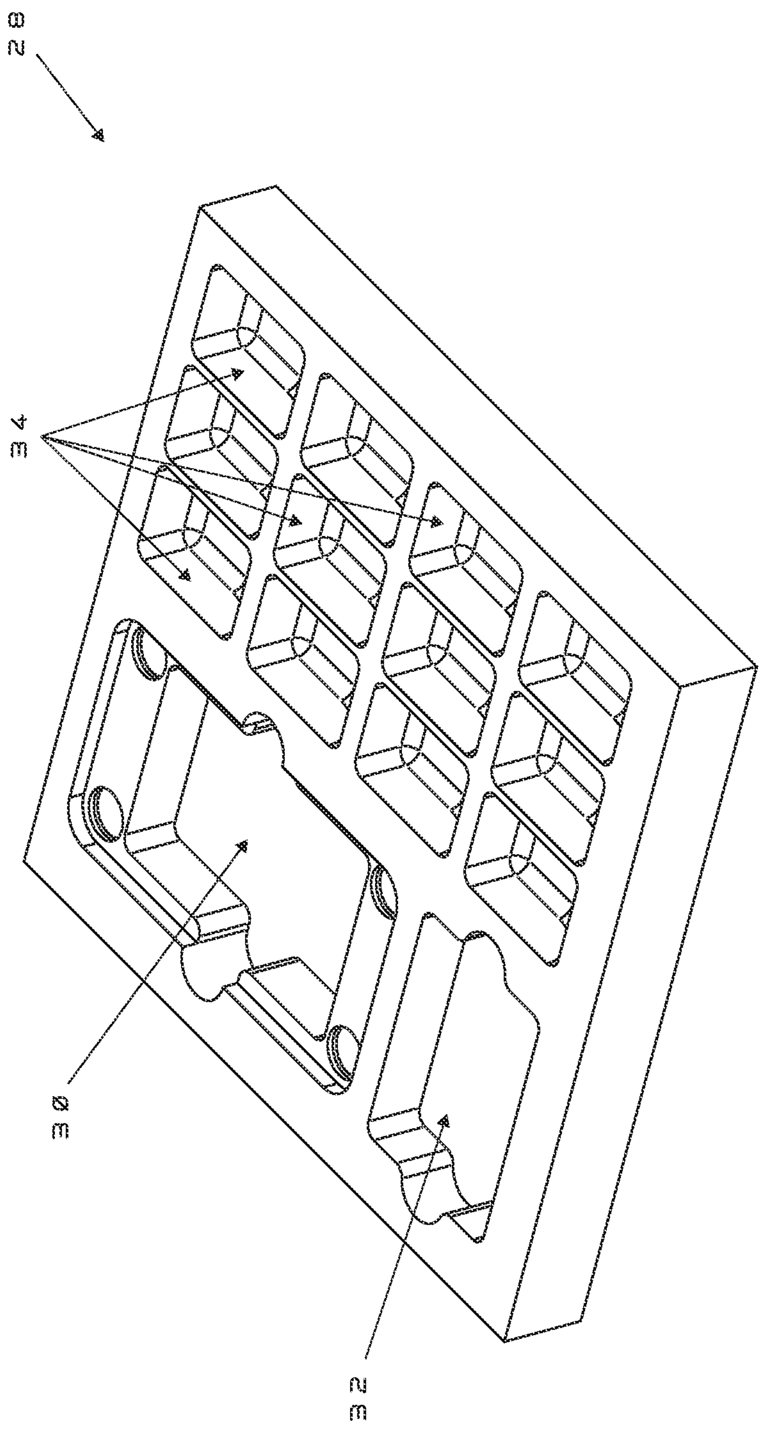
FIG. 8 is a three-dimensional isometric view of a storage element thereof.

FIG. 8 shows a storage device 28 which includes a first storage compartment 30 for storing the base board 4 and print board 6, a second storage compartment 32 for storing an ink pad (not shown), and multiple stamp storage compartments 34 for storing the various stamps 8.

Figure 9:
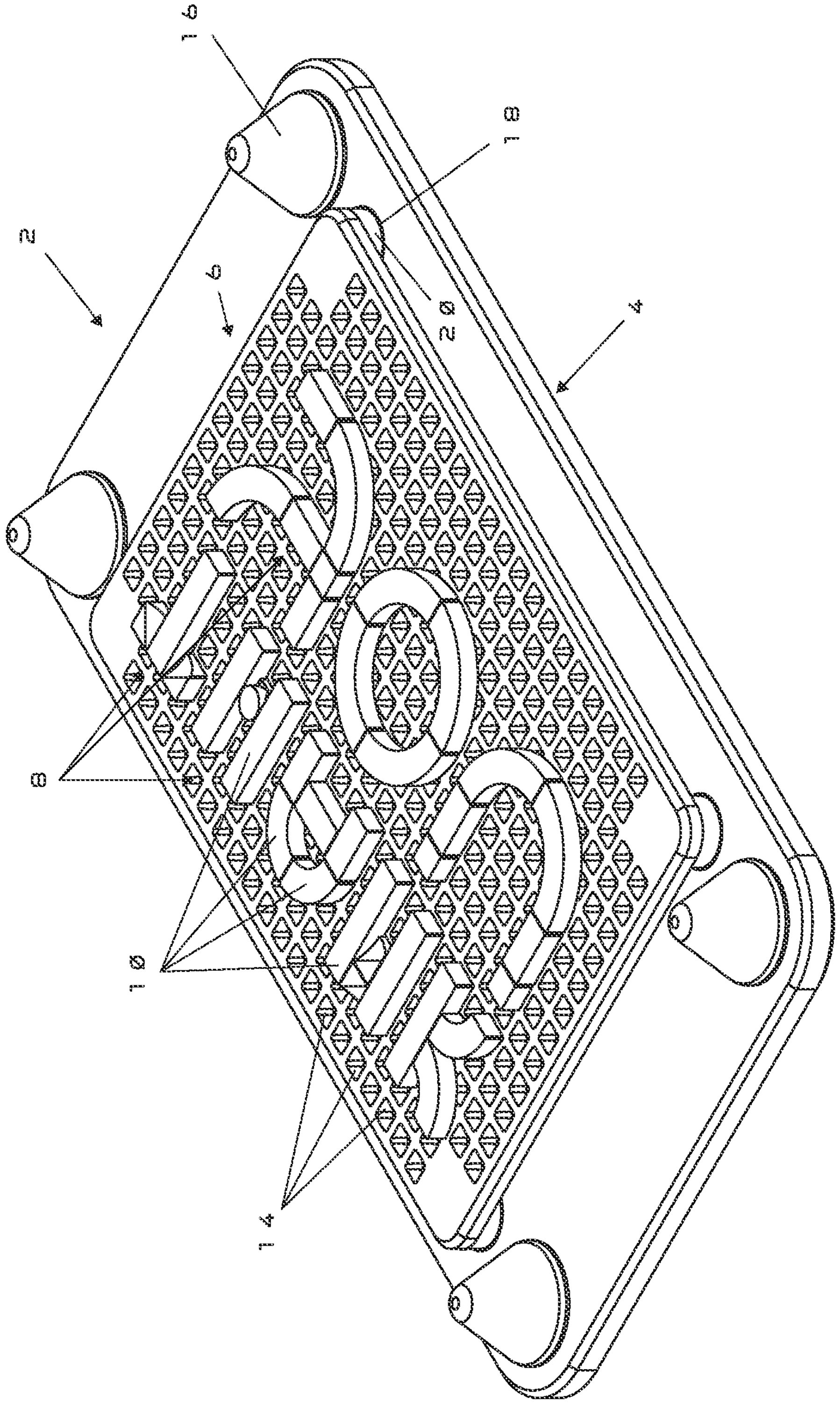
FIG. 9 is a three-dimensional isometric view showing the exploded view of FIG. 1 in an assembled orientation.
Figure 10:
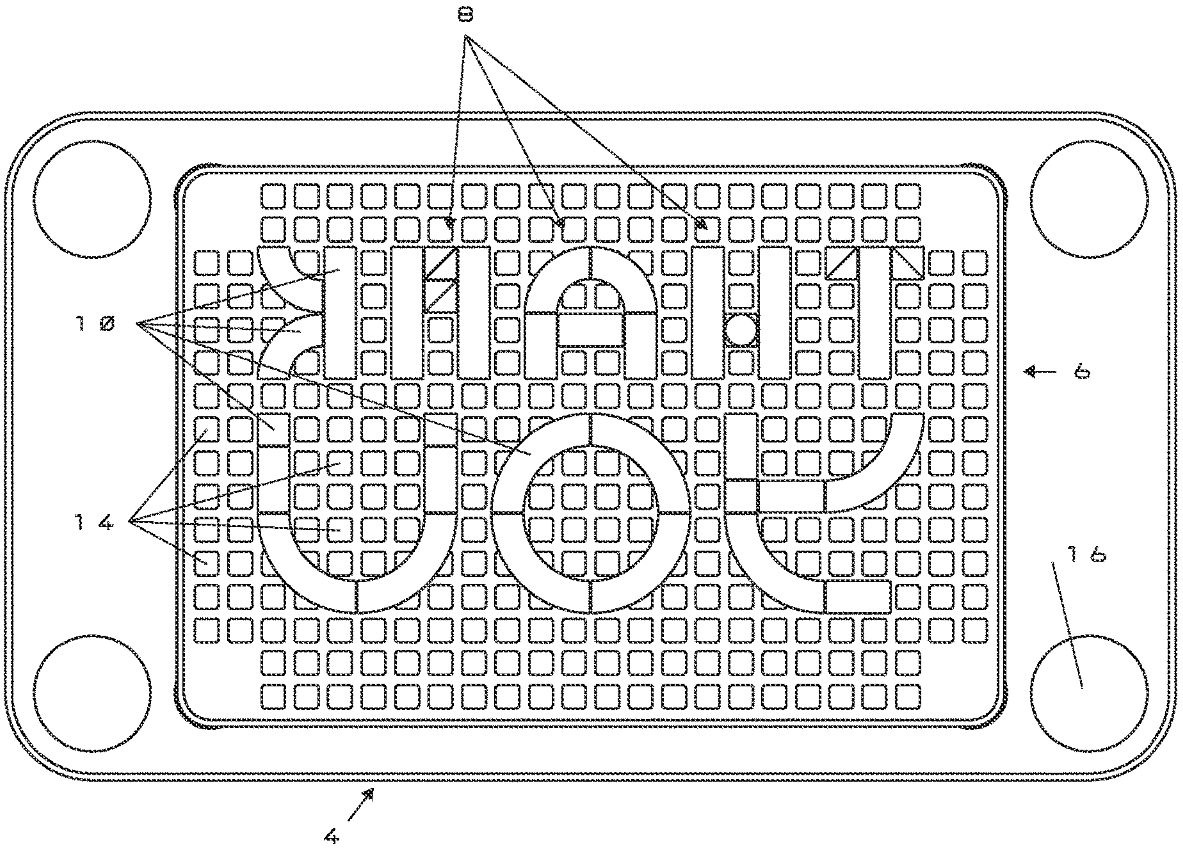
FIG. 10 is a top plan view thereof.
Figure 11:
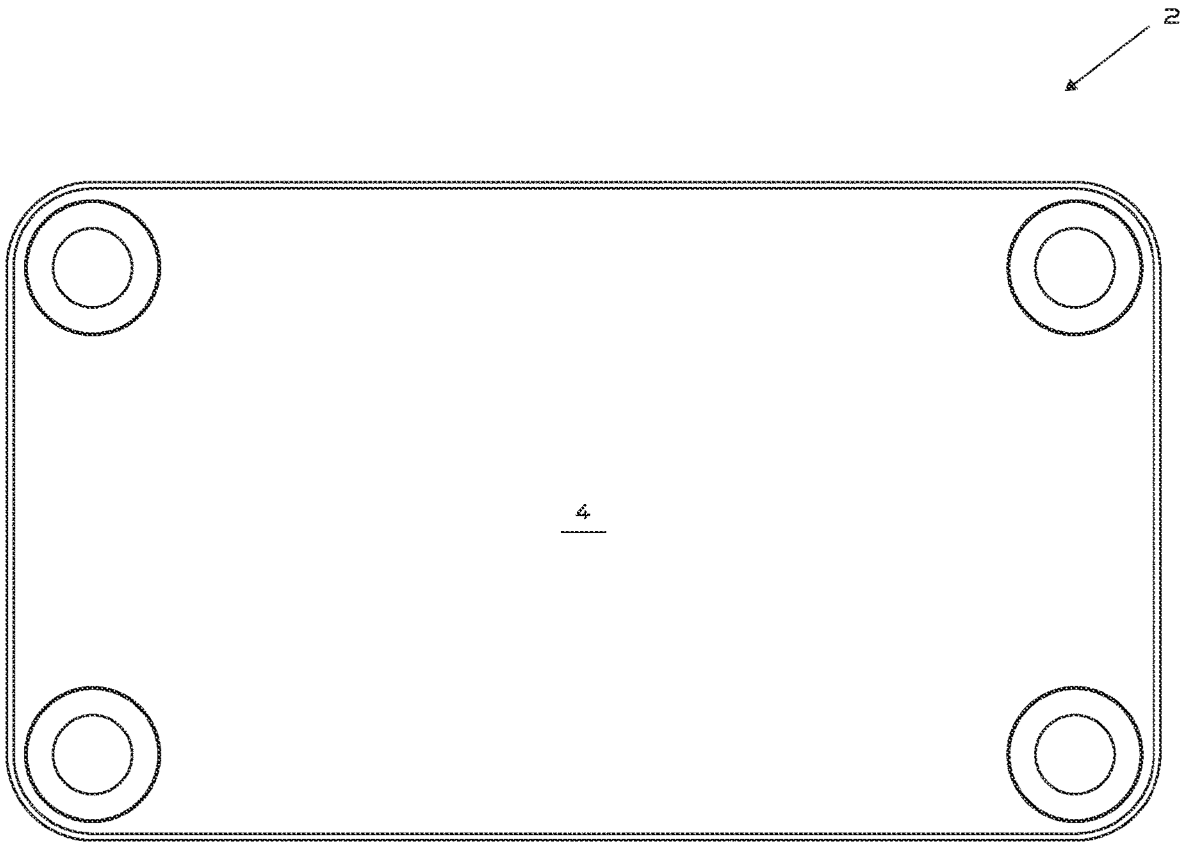
FIG. 11 is a bottom plan view thereof.
Figure 12:
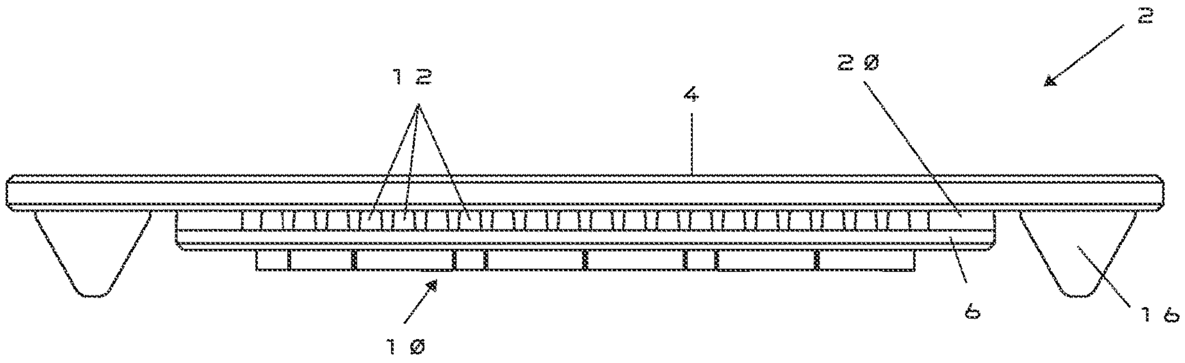
FIG. 12 is a front elevational view thereof.
Figure 13:
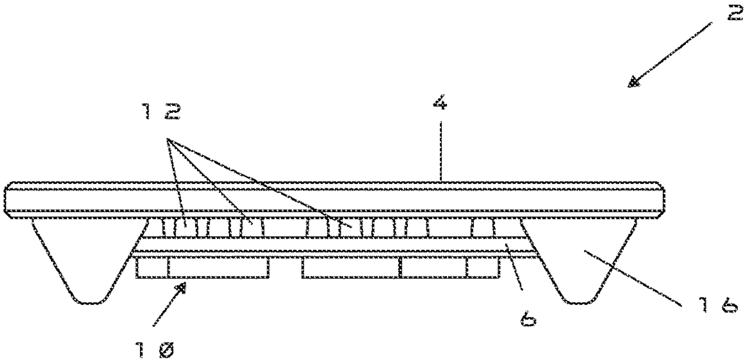
FIG. 13 is a side elevational view thereof.

FIG. 9 shows the embodiment of FIG. 1 in a fully assembled state with the stamps 8 installed within the grid openings 14 of the print board 6, with the print board connected to the base board 4. FIGS. 10-13 show other views thereof.

Figure 14:
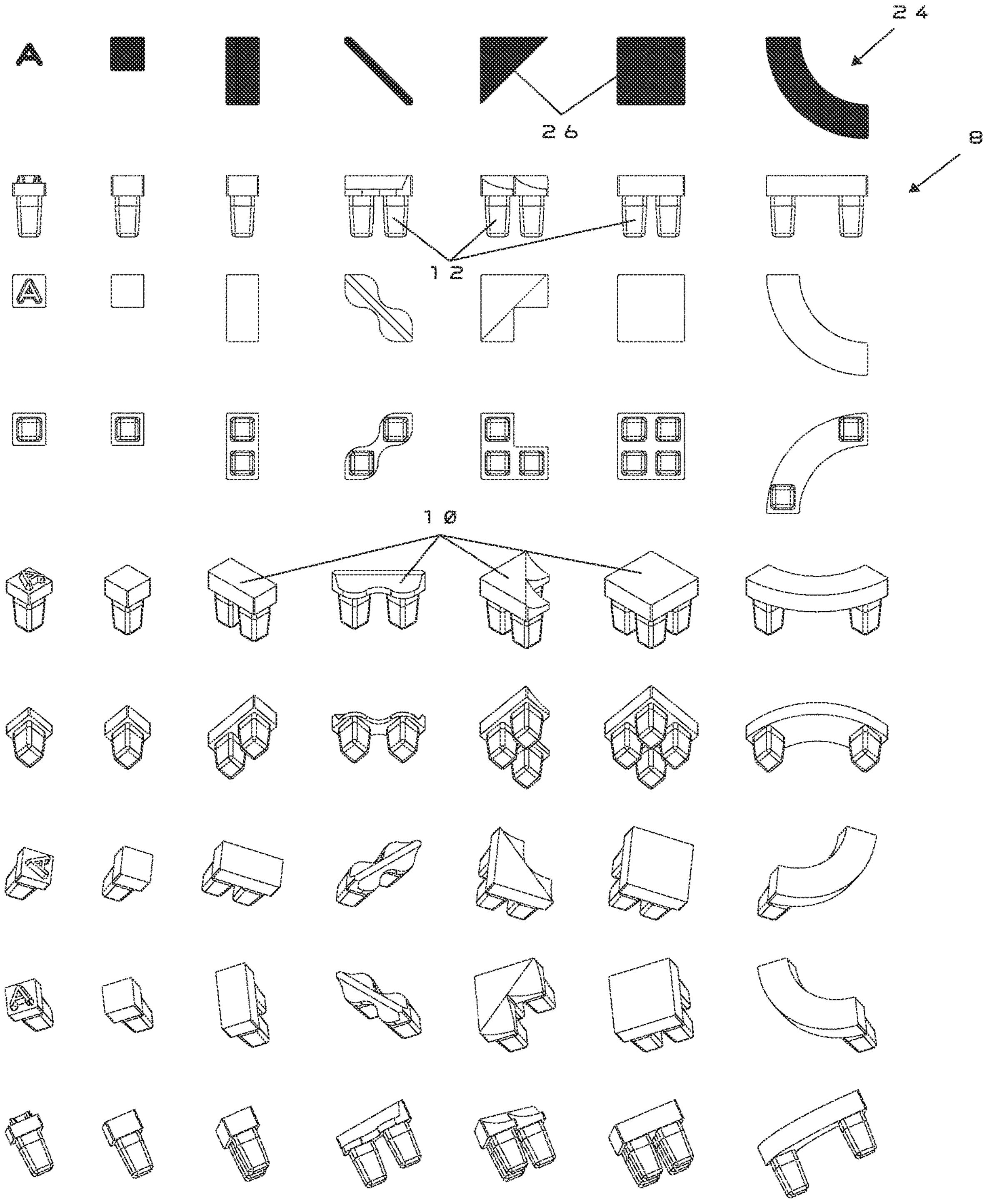
FIG. 14 shows a variety of stamp elements and their respective stamps, where the stamp elements are shown in elevational views, plan views, and isometric views from multiple angles.
Figure 15:
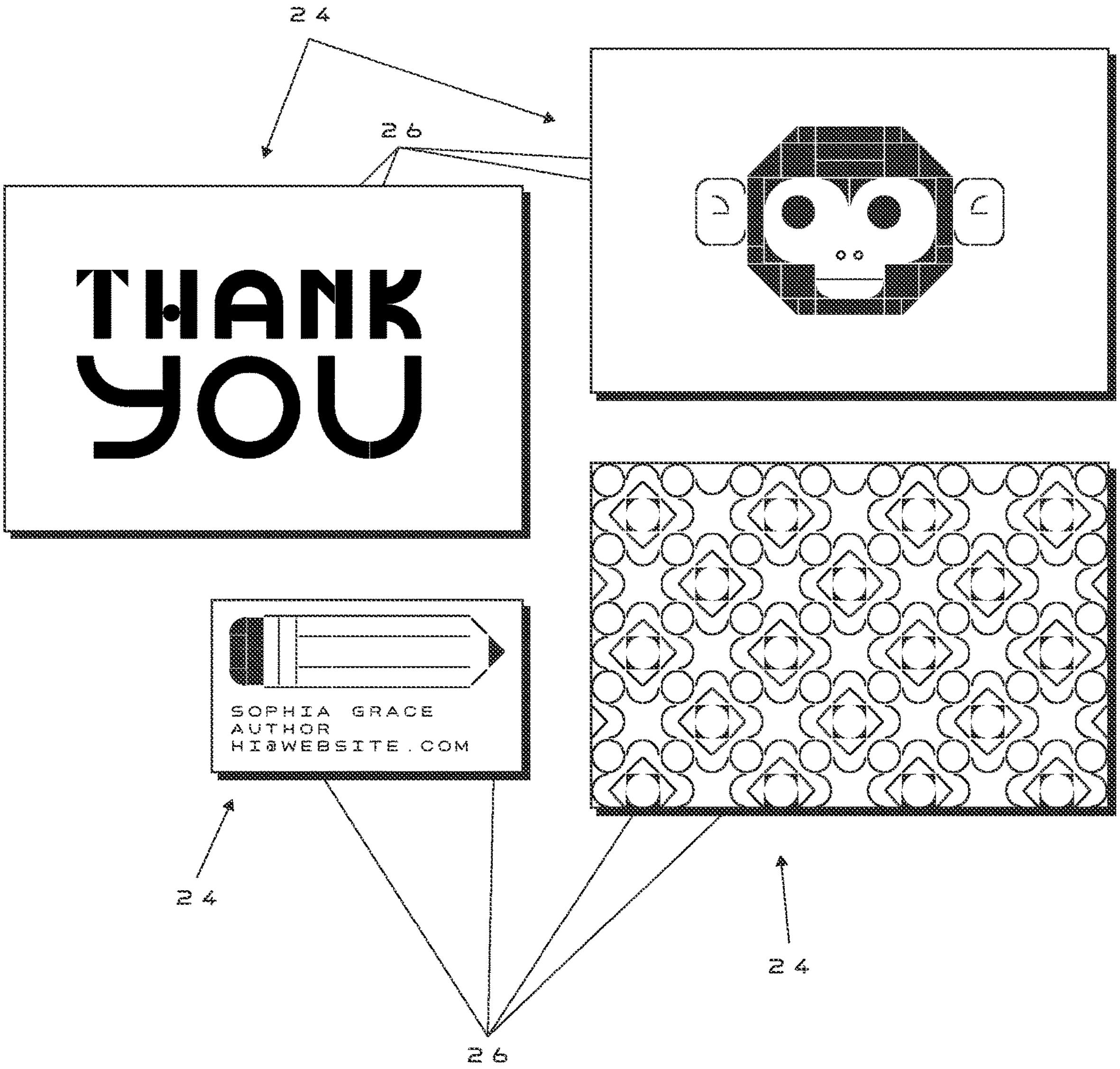
FIG. 15 shows a variety of final printed elements produced from an embodiment of the present invention.

FIG. 14 shows how the various stamps 8 may appear. These are simply examples of the stamps, and other stamp shapes or types may be included. FIG. 15 shows how final printed images 24 formed from inked elements 26 provided by the stamps 8.

Other embodiments of the present invention may also be employed. For example, a print board without a baseboard could function to produce inked images. The print board could be held in place with screws, bearings, or gears, or could simply be a uniform piece of plastic with receivers for the various stamps. It would be possible to use the print board and stamps in a crank-fed or gear-fed assembly with a roller or other suitable device.

III. Alternative Embodiment Print System 102

Figure 16:
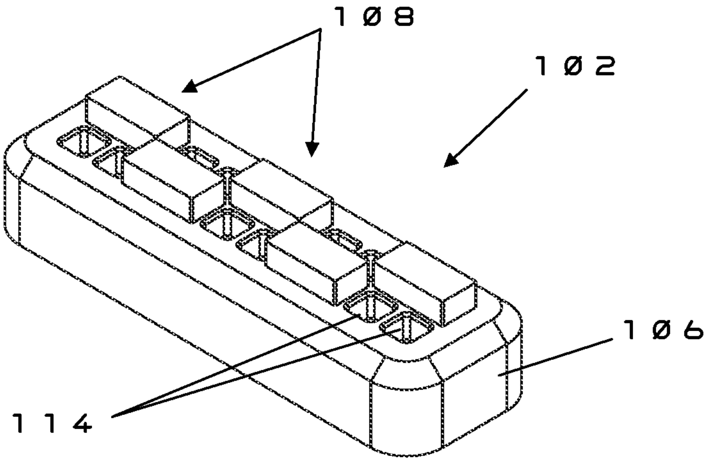
FIG. 16 is a three-dimensional isometric view of an alternative embodiment print board element with stamp elements directly inserted.
Figure 17:
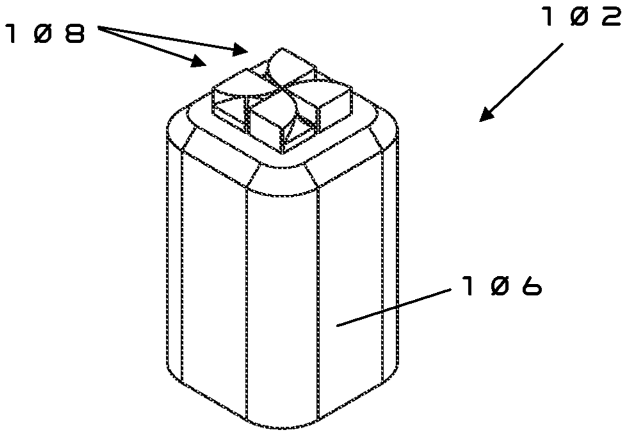
FIG. 17 is another three-dimensional isometric view thereof having alternative geometry.
Figure 18:
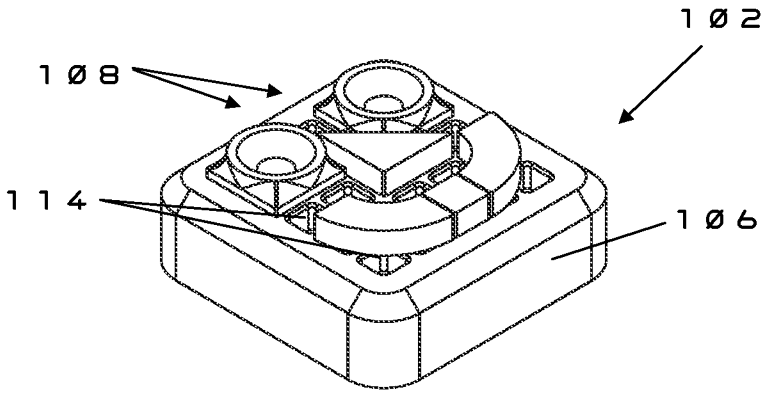
FIG. 18 is another three-dimensional isometric view thereof having alternative geometry.

FIGS. 16-18 show alternative embodiment manual printing systems 102 with print boards 106 capable of receiving stamps 108, similar if not identical to the stamps 8 from the prior embodiment, for use without a baseboard or other locked in element. FIG. 16 shows a long, short print board 106, whereas FIG. 17 shows a taller print board 106 and FIG. 18 shows a squared print board 106. The same openings 114 receive the stamps 108 via their lower portions. Otherwise, the function remains the same.

Other manual print systems employing cranks, gears, and screw elements could also be used by including elements of the present invention. These systems could also be mechanized in some manner, and even automated.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A manual print system comprising:

a print board comprising a square grid, said square grid comprised of a plurality of openings;

a plurality of stamps, each of said plurality of stamps comprising a top portion and a bottom portion;

each said top portion of said plurality of stamps comprising a printable shape from a set of at least four distinct printable shapes;

each one of said plurality of stamps further comprises a color from of at least three distinct colors, wherein each of said at least four distinct colors are associated with said at least three distinct printable shapes;

wherein said color is configured to enhance sort ability amongst said plurality of stamps to aid in the selection of a desired printable shape from said at least three distinct printable shapes;

each said bottom portion of said plurality of stamps comprising a tapered wedge configured to be received and secured within a selected one of said plurality of openings;

each said bottom portion comprising a bottom portion configured to release said stamp from said selected one of said plurality of openings upon receiving upward pressure without requiring the use of tools and without disturbing adjacently placed stamps;

a base board having four sides and four corners, the base board comprising four receivers;

said baseboard configured to receive said print board such that said print board is at least temporarily secured within said baseboard;

said baseboard configured to be inverted and pressed, such that said plurality of stamps located on said print board print an image onto a surface;

said baseboard further comprising four conical stoppers, each located at a respective corner of said four corners;

said conical stoppers configured to depress when said baseboard is pressed; and said conical stoppers further configured to return to their original shape when released.

2. The system of claim 1 further comprising:

said print board comprising at least one foot;

said baseboard comprising at least one receiver; and wherein said at least one foot secures said print board to said base board via said at least one receiver.

3. The system of claim 2, wherein said receiver and said foot each comprise a magnetic element configured to secure said foot within said receiver.

4. A method of printing an image on a surface, the method comprising the steps:

providing a print board comprising a square grid, said square grid comprised of a plurality of openings:

providing a plurality of stamps, each of said plurality of stamps comprising a top portion and a bottom portion, wherein each one of said plurality are color-coordinated to a respective color selected from of at least three distinct colors;

wherein each said top portion of said plurality of stamps comprising a printable shape;

sorting said plurality of stamps based upon each one of said plurality of stamps respective color;

inserting one or more of said plurality of stamps into respective openings by placing said bottom portion of each of said one or more of said plurality of stamps into their respective openings, each said bottom portion of said plurality of stamps comprising a tapered wedge, thereby creating a desired image;

inverting said print board and said one or more of said plurality of stamps over the surface;

pressing said top portions of said one or more of said plurality of stamps against said surface;

removing said top portions of said one or more of said plurality of stamps from said surface, thereby leaving behind an image on said surface;

providing a base board having four sides and four corners;

connecting said print board to said base board;

providing four conical stoppers to said baseboard;

using said base board to press said print board and said one or more of said plurality of stamps against said surface;

depressing said four conical stoppers when said print board and said one or more of said plurality of stamps is pressed against said surface; and returning said four conical stoppers to their original shape upon removing said print board and said one or more of said plurality of stamps from said surface.

5. The method of claim 4, further comprising the steps:

pressing against the bottom portion of a selected one of said one or more of said plurality of stamps;

dislodging said selected one of said one or more of said plurality of stamps from its respective opening; and removing said selected one of said one or more of said plurality of stamps without disturbing adjacent stamps.

6. The method of claim 4, further comprising the step:

connecting a foot of said print board to a receiver within said baseboard.

7. The method of claim 6, further comprising the steps:

providing a first magnet within said baseboard receiver;

providing a second magnet within said print board foot; and securing said foot to said receiver via said first and second magnets.

8. The method of claim 4, wherein:

said plurality of stamps comprising a first set of stamps comprising a first shape of their respective top portions;

said plurality of stamps comprising a second set of stamps comprising a second shape of their respective top portions; and said first shape and said second shape are distinguishable.

* * * * *